(No Model.)

S. C. ELLIS.
TRICYCLE.

No. 361,581. Patented Apr. 19, 1887.

Witnesses
H. S. Knight
Edward Stier

Inventor
S. C. Ellis
By his Attorney
Knight Bros

United States Patent Office.

SILAS C. ELLIS, OF ST. LOUIS, MISSOURI.

TRICYCLE.

SPECIFICATION forming part of Letters Patent No. 361,581, dated April 19, 1887.

Application filed September 9, 1886. Serial No. 213,134. (No model.)

*To all whom it may concern:*

Be it known that I, SILAS C. ELLIS, a citizen of the United States, residing at the city of St. Louis, in the State of Missouri, have invented a certain new and useful Improvement in Tricycles, of which the following is a full, clear, and exact description, reference being had to the accompanying drawings, forming part of this specification, and in which—

Figure 1:
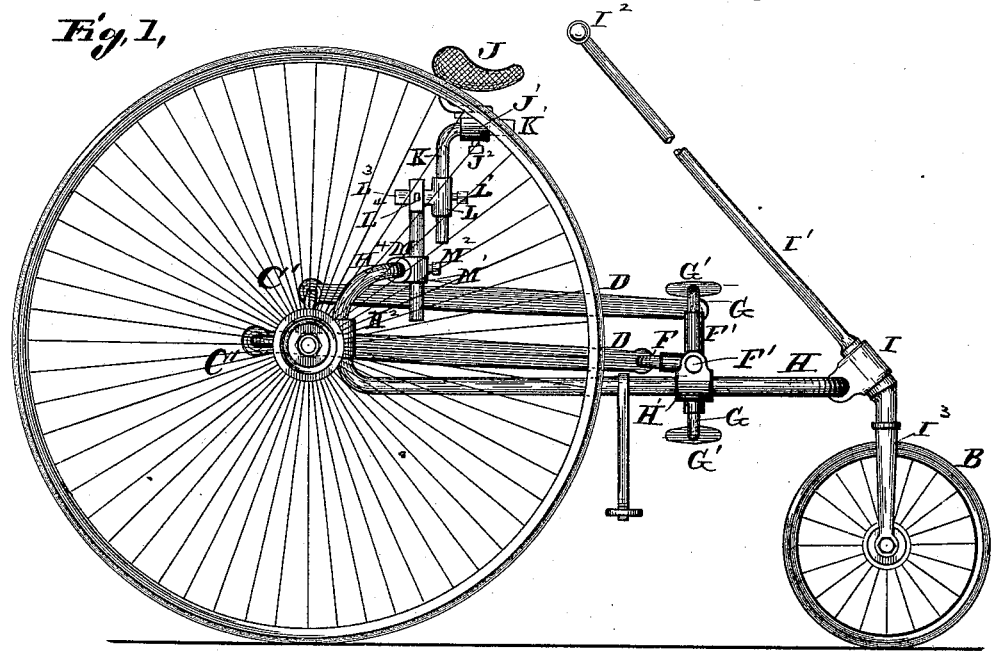
Figure 2:
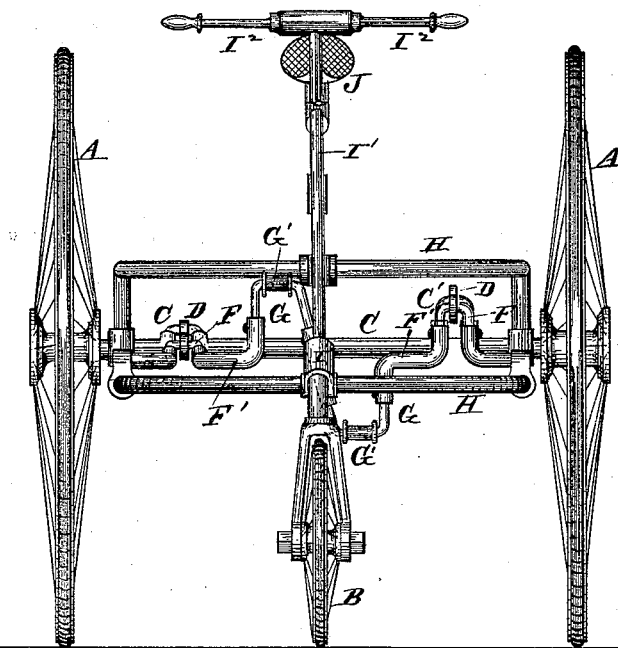
Figure 3:
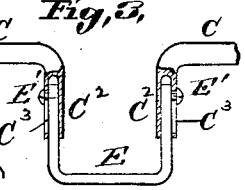

Figure 1 is a side elevation of my improved machine. Fig. 2 is a front elevation, and Fig. 3 is a detail view showing one of the cranks.

My invention relates to certain improvements in tricycles; and it consists in features of novelty, hereinafter fully described, and pointed out in the claims.

Referring to the drawings, A represents the main wheels, and B the steering-wheel.

C represents the axle of the main wheels, provided with cranks C', with which the rear ends of pitmen or arms D are connected, as shown. The cranks preferably consist of out-turned ends C² of the axle, which are made hollow to receive the inner ends of U-shaped rods E, the rods being held to any adjustment in the ends C² by set-screws E', attached thereto, and working in slots C³ of the out-turned ends C². (See Fig. 3.) The pitmen are connected to the U-shaped rods E, and it will thus be seen that by moving the rods E outward, by loosening the screws E', the length of each crank can be increased, the rods being held to any adjustment by the set-screws E'. I have shown one of these cranks with part of the axle in Fig. 3, and the other is the same.

The front ends of the arms or pitmen D are connected to cranks F on a shaft, F'. The cranks F are formed in the same way as those at C', so that they can be adjusted to make them longer or shorter.

The shaft F' has treadles G. These treadles are formed in the same manner as the cranks C' and F, and are provided with foot-pieces G'. The treadles can thus be adjusted to make them longer or shorter to suit the convenience of the person using the machine, or to increase or diminish the power of the machine. It will thus be seen that the treadles thus arranged or formed have a rotary instead of an oscillatory movement.

The outer ends of the shaft F' are journaled in boxes H', secured to a frame, H, the frame in turn being secured at its rear part to the axle C, as shown at H², and it is connected at its front end to a block, I, through which passes a steering-rod, I', of the wheel B, the rod having handles I² on its upper end and having a yoke, I³, at its lower end, in which the wheel B is journaled. The handle I² is in position to be conveniently reached by a person sitting on the seat J.

The seat is made adjustable toward the handle by having a collar, J', sliding on the horizontal end K' of a vertical rod, K, and being held to any adjustment by a set-screw, J², passing through the collar. The seat is made vertically adjustable by the rod K passing through a collar, L, where it is held to any suitable adjustment by a set-screw, L', and a further horizontal and vertical adjustment of the seat is obtained by fitting the neck L³ of the collar L into a socket formed in the upper end of a vertical rod, M, the neck being held in the socket to any adjustment by a set-screw, L⁴, and the rod M passing through a collar, M', secured to the frame H, and held to any adjustment by a set-screw, M². Thus, by this arrangement, any desired elevation may be given to the seat, and it may be shifted horizontally to any desired position.

The frame H is preferably bent forward, as shown at H⁴, so as to throw the seat well forward, in order that in case the wheel B should pass over any obstruction there would be no danger of the person's weight being thrown back of the axle C, which would result in the machine being tilted backward, and the same objection is avoided in going uphill—that is, the person's weight is always kept forward of the axle C.

I claim as my invention—

1. In a tricycle, the combination of the main wheels and steering-wheel, the axle to which the main wheels are secured, adjustable cranks on said axle, a shaft, adjustable cranks on said shaft, pitmen connecting said cranks, and treadles on said shaft, substantially as and for the purpose set forth.

2. In a tricycle, the combination of the main wheels and steering-wheel, the axle to which the main wheels are secured, adjustable cranks on said axle, a shaft, adjustable cranks on said shaft, pitmen connecting the said cranks, and adjustable treadles on said shaft, substantially as set forth.

3. In a tricycle, the combination of the main wheels and steering-wheel, the axle to which the main wheels are secured, cranks on said axle, consisting of U-shaped rods telescoping the hollow ends of the axle and held in place by set-screws fitting in slots in the hollow ends of the axle, shaft, cranks on said shaft, pitmen connecting the said cranks, and treadles on said shaft, substantially as set forth.

4. In a tricycle, the combination of the main wheels and steering-wheel, the axle to which the main wheels are secured, cranks on said axle, a shaft, cranks on said shaft, pitmen connecting said cranks and treadles on the shaft, the cranks, and treadles consisting of bars telescoping the hollow ends of the axle and shaft, respectively, and held to any adjustment by set-screws, substantially as set forth.

5. In a tricycle, the combination of the main wheels, steering-wheel, axle to which the main wheels are secured, crank-shaft upon which the adjustable treadles are formed, the pitmen connecting the cranks on the axle to the cranks on the shaft, substantially as and for the purpose set forth, and the adjustable seat J, arranged as shown and described.

SILAS C. ELLIS.

In presence of—
GEO. H. KNIGHT,
EWD. S. KNIGHT.